United States Patent
Dong et al.

(10) Patent No.: US 12,346,295 B2
(45) Date of Patent: Jul. 1, 2025

(54) METHOD, DEVICE, AND COMPUTER PROGRAM PRODUCT FOR HIERARCHICAL STORAGE OF FILES

(71) Applicant: Dell Products L.P., Round Rock, TX (US)

(72) Inventors: Helen Dong, Chengdu (CN); Michael Chen, Chengdu (CN); Huijuan Fan, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/525,610

(22) Filed: Nov. 30, 2023

(65) Prior Publication Data
US 2025/0103560 A1 Mar. 27, 2025

(30) Foreign Application Priority Data
Sep. 25, 2023 (CN) .......................... 202311246206.8

(51) Int. Cl.
*G06F 16/10* (2019.01)
*G06F 16/185* (2019.01)
(52) U.S. Cl.
CPC ................................. *G06F 16/185* (2019.01)

(58) Field of Classification Search
CPC ..................................................... G06F 16/185
See application file for complete search history.

(56) References Cited

U.S. PATENT DOCUMENTS

| 10,042,578 | B2 * | 8/2018 | Karve | ..................... G06F 3/061 |
| 10,339,100 | B2 * | 7/2019 | Xu | ......................... G06F 16/122 |
| 2018/0088870 | A1 * | 3/2018 | Lv | ......................... G06F 3/0605 |
| 2022/0382644 | A1 * | 12/2022 | Yadav | ................. G06F 11/1448 |

\* cited by examiner

*Primary Examiner* — Kristopher Andersen
(74) *Attorney, Agent, or Firm* — Amin, Turocy & Watson, LLP

(57) ABSTRACT

Hierarchical storage of files is described. An example method includes determining an input/output (IO) mode, a file size, and a file access frequency of a target file, and determining IO mode performances of the IO mode at different tiers of a storage system. The method further includes determining, based on the file size of the target file, respective storage costs when the target file is stored at the different tiers of the storage system. In addition, the method further includes determining a target tier at which the target file is stored based on the IO mode performances, the respective storage costs, the file size, and the file access frequency. In this way, it is possible to make full use of less expensive storage tiers and save the cost of the storage system, as well as to reduce the response time and improve the performance of the storage system.

20 Claims, 12 Drawing Sheets

300

| IO mode | Storage device type | IOPS | Bandwidth (MB/s) | Response time (ms) | IO mode performance |
|---|---|---|---|---|---|
| 4K_0R_100S | SSD | 2840 | 6.85 | 0.41 | 0.9752 |
| | SAS | 2929 | 6.84 | 0.404 | 0.9807 |
| | NLSAS | 3010 | 7.22 | 0.383 | 1.0351 |
| 4K_0R_0S | SSD | 2649 | 6.45 | 0.452 | 1.3269 |
| | SAS | 1867 | 4.45 | 0.86 | 0.8473 |
| | NLSAS | 1786 | 4.31 | 0.836 | 0.8268 |
| 8K_70R_0S | SSD | 1879 | 11.72 | 0.41 | 2.4005 |
| | SAS | 311 | 1.93 | 3.82 | 0.3475 |
| | NLSAS | 225 | 1.41 | 5.31 | 0.2520 |
| 64K_90R_100S | SSD | 2507 | 149.25 | 0.28 | 1.5005 |
| | SAS | 1305 | 87.54 | 1.08 | 0.6480 |
| | NLSAS | 1946 | 99.57 | 0.8 | 0.8515 |

FIG. 3

METHOD, DEVICE, AND COMPUTER PROGRAM PRODUCT FOR HIERARCHICAL STORAGE OF FILES

RELATED APPLICATION

The present application claims the benefit of priority to Chinese Patent Application No. 202311246206.8, filed on Sep. 25, 2023, which application is hereby incorporated into the present application by reference herein in its entirety.

TECHNICAL FIELD

The present disclosure relates to the field of data storage and, for example, to a method, a device, and a computer program product for hierarchical storage of files.

BACKGROUND

Hierarchical storage of files is a data management method that is intended to efficiently manage and store large amounts of data and to store the data hierarchically in different storage tiers based on the access frequency and importance of the data, so as to achieve both cost effectiveness and performance optimization. These storage tiers typically include a high-performance tier, a medium-performance tier, and a low-performance tier. Storage apparatuses in the high-performance tier have the highest file access speeds and are the most expensive. Storage apparatuses in the medium-performance tier are less expensive and have relatively large capacities, but their file access speeds are lower than those in the high-performance tier. Storage apparatuses in the low-performance tier are the least expensive, but at the same time have the lowest file access speeds.

An advantage of hierarchical storage of files is that it allows businesses to find a balance between performance and cost so as to meet the needs of storage of different data. With hierarchical storage of files, businesses can reduce storage costs while still having quick access to the most commonly used data. Migration and management of data is typically performed automatically by storage management software in order to ensure that data is located at the appropriate tier. This method helps optimize the use of storage resources, improves the performance, and ensures the availability of critical data.

SUMMARY

Embodiments of the present disclosure present a method, a device, and a computer program product for hierarchical storage of files. In the solution provided by embodiments of the present disclosure, when determining a storage tier for a target file, in addition to acquiring an access frequency for the target file, an input/output (IO) mode of the target file and a file size of the target file may also be acquired. The solution may then determine, for the IO mode of the target file, a plurality of IO mode performance scores of the IO mode at different storage tiers. In addition, this solution may further determine, based on the file size of the target file, a plurality of storage costs corresponding to the target file when it is stored at different storage tiers respectively. After determining the plurality of IO mode performance scores and the plurality of storage cost scores corresponding to the plurality of storage tiers, it may be determined at which storage tier the target file is stored most appropriately based on the plurality of IO mode performance scores, the plurality of storage costs, and the file size and access frequency of the target file. In this way, the determination of the storage tier for the target file not only is based on the access frequency of the target file, but also takes into account the IO mode of the target file as well as its storage cost, which can thus optimize the file hierarchization strategy, thereby taking full advantage of the low-priced storage tiers and saving the cost of the storage system. In addition to this, files that are better suitable for storage at the high-performance tier can also be migrated to a higher storage tier, thus reducing the response time and improving the performance of the storage system.

In a first example embodiment of the present disclosure, a method for hierarchical storage of files is provided. The method includes determining an input/output (IO) mode, a file size, and a file access frequency of a target file. The method further includes determining a plurality of IO mode performances of the IO mode at a plurality of tiers of a storage system. The method further includes determining, based on the file size of the target file, a plurality of storage costs when the target file is stored at the plurality of tiers of the storage system. In addition, the method further includes determining a target tier at which the target file is stored based on the plurality of IO mode performances, the plurality of storage costs, the file size, and the file access frequency.

In a second example embodiment of the present disclosure, an electronic device is provided. The electronic device includes one or more processors; and a memory coupled to the at least one processor and having instructions stored thereon, wherein the instructions, when executed by the at least one processor, cause the electronic device to perform actions including: determining an input/output (IO) mode, a file size, and a file access frequency of a target file. The actions further include determining a plurality of IO mode performances of the IO mode at a plurality of tiers of a storage system. The actions further include determining, based on the file size of the target file, a plurality of storage costs when the target file is stored at the plurality of tiers of the storage system. In addition, the actions further include determining a target tier at which the target file is stored based on the plurality of IO mode performances, the plurality of storage costs, the file size, and the file access frequency.

In a third example embodiment of the present disclosure, a computer-readable storage medium is provided, on which a computer program is stored, which, when executed by a processor, implements a method for hierarchical storage of files. The method includes determining an input/output (IO) mode, a file size, and a file access frequency of a target file. The method further includes determining a plurality of IO mode performances of the IO mode at a plurality of tiers of a storage system. The method further includes determining, based on the file size of the target file, a plurality of storage costs when the target file is stored at the plurality of tiers of the storage system. In addition, the method further includes determining a target tier at which the target file is stored based on the plurality of IO mode performances, the plurality of storage costs, the file size, and the file access frequency.

It should be understood that the content described in this Summary part is neither intended to limit key or essential features of the embodiments of the present disclosure, nor intended to limit the scope of the present disclosure. Other features of the present disclosure will become readily understood from the following description.

BRIEF DESCRIPTION OF THE DRAWINGS

The above and other features, advantages, and aspects of the embodiments of the present disclosure will become more apparent with reference to the accompanying drawings and the following detailed description. In the accompanying drawings, identical or similar reference numerals represent identical or similar elements, in which:

FIG. 3 illustrates a schematic diagram of an example of IO mode performance scores for different IO modes on different types of storage devices according to some embodiments of the present disclosure;

DETAILED DESCRIPTION

Figure 1:
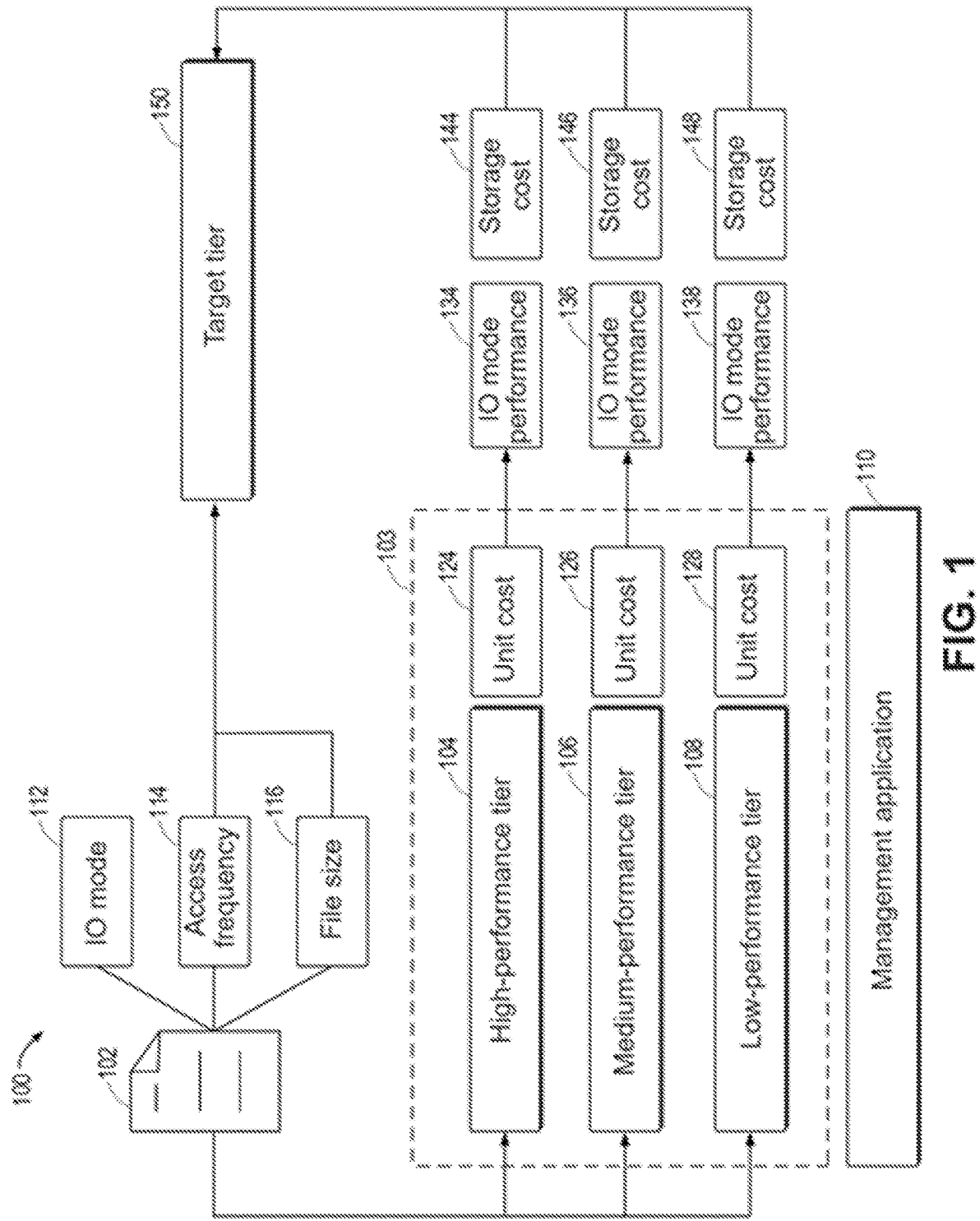
FIG. 1 illustrates a schematic diagram of an example environment in which a plurality of embodiments of the present disclosure can be implemented.

The following will describe the embodiments of the present disclosure in more detail with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of the embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

Hierarchical storage of files enables movement of files among different storage tiers of a storage system based on specific rules. In some conventional solutions, a file hierarchization strategy can select an appropriate storage tier for a target file based on its access frequency. For example, if the target file has a high access frequency, the file hierarchization strategy can move the file to a storage tier with a high performance, and the high-performance storage tier can be, for example, a tier with solid-state disk (SSD) drives. If the target file has a low access frequency, the file hierarchization strategy can move the file to a storage tier with a low performance, and the low-performance storage tier can be, for example, a storage tier with a serially attached small computer system interface (SAS) drive or a near-line SAS (NL-SAS) drive, which can save costs and improve the efficiency of use of a storage device.

However, storage workloads resulting from client applications accessing files typically have specific IO modes, and different IO modes exhibit different performances at different storage tiers. For some IO modes, the difference between the performance exhibited on a high-performance storage tier and that on a low-performance storage tier is small; therefore, if files with these IO modes are stored at the high-performance storage tier because of high access frequencies, it will not bring significant performance improvement and at the same time take up expensive high-performance storage resources. By contrast, for some other IO modes, the difference between the performance exhibited at the high-performance storage tier and that at the low-performance storage tier is large; therefore, if files with these IO modes are stored at the low-performance storage tier because of not very high access frequencies, potential performance gains and opportunities to enhance user experience will be missed.

In addition to this, the impact of the difference in storage costs among various storage tiers on the hierarchical storage of files is not considered in conventional solutions. For example, if the difference in costs among multiple storage tiers is large, and if two files have the same file access frequency, moving the file with a larger file size to a high-performance storage tier will take up more expensive high-performance storage resources, thus producing a high storage cost, which will make the resources of the storage system unable to be used reasonably.

To this end, embodiments of the present disclosure propose a solution for hierarchical storage of files. When determining a storage tier for a target file, the method may acquire an IO mode of the target file and a file size of the target file in addition to acquiring an access frequency to the target file. The solution may then determine, for the IO mode of the target file, a plurality of IO mode performance scores of the IO mode at different storage tiers. In addition, this solution may further determine, based on the file size of the target file, a plurality of storage costs corresponding to the target file when it is stored at different storage tiers respectively. After determining the plurality of IO mode performance scores and the plurality of storage cost scores corresponding to the plurality of storage tiers, it may be determined at which storage tier the target file is stored most appropriately based on the plurality of IO mode performance scores, the plurality of storage costs, and the file size and access frequency of the target file. In this way, the determination of the storage tier for the target file not only is based on the access frequency of the target file, but also takes into account the IO mode of the target file as well as its storage cost, which can thus optimize the file hierarchization strategy, thereby taking full advantage of the low-priced storage tiers and saving the cost of the storage system. In addition to this, files that are better suitable for storage at the high-performance tier can also be migrated to a higher storage tier, thus reducing the response time and improving the performance of the storage system and the user experience.

FIG. 1 illustrates a schematic diagram of an example environment 100 in which a plurality of embodiments of the present disclosure can be implemented. As shown in FIG. 1, the environment 100 includes a target file 102 for which a storage tier is to be determined, a storage system 103, and a management application 110, where the storage system 103 includes a high-performance tier 104, a medium-performance tier 106, and a low-performance tier 108. The high-performance tier 104 may, for example, be a storage tier having SSD drives, which is characterized by the highest file access speeds, but the storage devices included in it are also the most expensive. The medium-performance tier 106 may, for example, be a storage tier having SAS drives, which is characterized by relatively low file access speeds, but the storage devices included in it are also less expensive. The low-performance tier 108 may, for example, be a storage tier having NL-SAS drives, which is characterized by the lowest file access speeds, but the storage devices included in it are the least expensive. It should be understood that while the storage systems in embodiments of the present disclosure all include three storage tiers, it is not intended to impose a limit on the number of storage tiers in a storage system. The solutions provided by embodiments of the present disclosure can be applied to storage systems with other numbers of storage tiers, such as storage systems with two storage tiers (e.g., a high-performance tier and a low-performance tier), storage systems with four storage tiers (e.g., a highest-performance tier, a high-performance tier, a low-performance tier, and a lowest-performance tier), and the like.

The target file 102 may be a file that has been stored in any of the storage tiers in the storage system 103, and as needed, it can be determined by the management application 110 whether to migrate the file to another storage tier, and to which storage tier. As shown in FIG. 1, the target file 102 has a plurality of attributes, including an IO mode 112, an access frequency 114, and a file size 116. The IO mode 112 may be related to a data size (e.g., 4 KB or 8 KB) of one IO operation, a ratio of read operations to write operations (e.g., one hundred percent read operations, one hundred percent write operations, or seventy percent read operations and thirty percent write operations), and an access approach (e.g., sequential access or random access). In the environment 100, the different storage tiers in the storage system 103 contain different types of storage devices, and therefore, unit costs (i.e., price per GB) of the different storage tiers are also different. As shown in FIG. 1, the high-performance tier 104 has a unit cost of 124, the medium-performance tier 106 has a unit cost of 126, and the low-performance tier 108 has a unit cost of 128.

As shown in FIG. 1, the management application 110 may determine the corresponding IO mode performance and storage cost when the target file 102 is stored at various storage tiers of the storage system 103. For example, the management application 110 may determine an IO mode performance 134 of the IO mode 112 at the high-performance tier 104 and a storage cost 144 consumed for storing the target file 102 at the high-performance tier 104, an IO mode performance 136 of the IO mode 112 at the medium-performance tier 106 and a storage cost 146 consumed for storing the target file 102 at the medium-performance tier 106, and an IO mode performance 138 of the IO mode 112 at the low-performance tier 108 and a storage cost 148 consumed for storing the target file 102 at the low-performance tier 108. In some embodiments, the IO mode performance (e.g., the IO mode performance may be expressed in the form of a score) of the IO mode at a particular storage tier may be determined based on the bandwidth, the number of IO operations per second (IOPS), and the response time. In some embodiments, the storage cost for storing the target file 102 on the storage tier may be determined based on the file size 116 of the target file 102 and the unit cost of the storage tier.

As shown in FIG. 1, after determining the IO mode performances 134, 136, and 138 and the storage costs 144, 146, and 148, the management application 110 may determine the difference in IO mode performances of the IO mode 112 across different storage tiers, where a large difference in IO mode performances may indicate that a large IO mode performance gain can result from migrating the target file 102 to a storage tier with a high performance, and a small difference in IO mode performances may indicate that a small IO mode performance loss can result from migrating the target file 102 to a storage tier with a low performance. In addition to this, the management application 110 may also determine the difference in storage costs of storing the target file 102 at different storage tiers, where a larger difference in storage costs may indicate that it will cost more to migrate the target file 102 to a storage tier with a high performance, and a small difference in storage costs may indicate that the storage cost changes little when the target file 102 is migrated to other storage tiers. The management application 110 may then determine a target tier 150 based on the difference in IO mode performances, the difference in storage costs, and the access frequency 114 and the file size 116 of the target file 102, and migrate the target file 102 from the storage tier where it is located to the target tier 150.

In this manner, when the difference in IO mode performances of the IO mode 112 at various storage tiers is small and the difference in storage costs of storing the target file 102 at various storage tiers is large, although the access frequency 114 of the target file 102 may be very high, it may still be possible to choose to store the target file 102 at a storage tier with a low storage cost, so that the storage cost can be significantly saved while hardly affecting the file access speed. At the same time, files that have a large difference in IO mode performances but have an access frequency not enough to reach a high threshold in the previous hierarchization strategy can be migrated to a storage tier with a high performance, thereby improving the performance of the entire storage system and enhancing the user experience.

Figure 2:
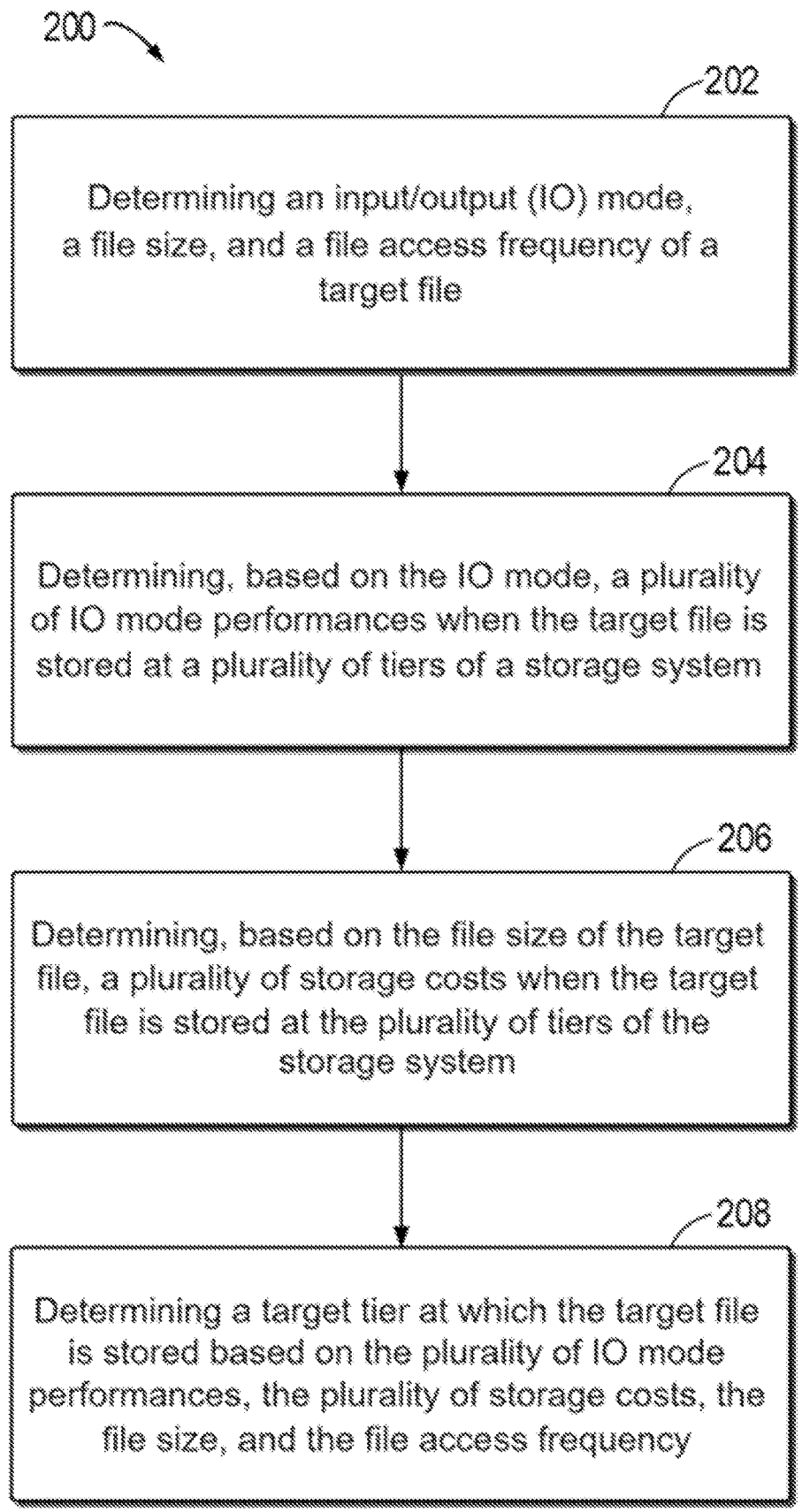
FIG. 2 illustrates a flow chart of a method for hierarchical storage of files, according to some embodiments of the present disclosure.

FIG. 2 illustrates a flow chart of a method 200 for hierarchical storage of files according to some embodiments of the present disclosure. As shown in FIG. 2, at a block 202, the method 200 may determine an IO mode, a file size, and a file access frequency of a target file. For example, in the environment 100 as shown in FIG. 1, the management application 110 may determine the IO mode 112, the file access frequency 114, and the file size 116 of the target file 102. The IO mode 112 may, for example, include a data size of one IO operation, a ratio of read operations to write operations, and an access approach. An example of the IO mode 112 may be as follows: a data size of 4 KB of one IO operation, one hundred percent read operations, and a sequential access approach.

At a block 204, the method 200 may determine a plurality of IO mode performances of the IO mode at a plurality of tiers of a storage system. For example, in the environment 100 as shown in FIG. 1, the management application 100 may determine an IO mode performance 134 of the IO mode 112 of the target file 102 at the high-performance tier 104 of the storage system 103, an IO mode performance 136 at the medium-performance tier 106, and an IO mode performance 138 at the low-performance tier 108, and the IO mode performances 134, 136 and 138 may, for example, be expressed in the form of scores. In some embodiments, a plurality of IO mode performances of each IO mode at various storage tiers may be pre-determined, and these pre-determined IO mode performances may be stored at an appropriate location. When the management application 110 needs to determine the target tier 150 for the target file 102, the plurality of IO mode performances corresponding to the IO mode 112 of the target file 102 may be read from the appropriate location. In this way, it is possible to save time spent on determining the plurality of IO mode performances and to improve the response speed.

At a block 206, the method 200 may determine, based on the file size of the target file, a plurality of storage costs when the target file is stored at the plurality of tiers. For example, in the environment 100 as shown in FIG. 1, the management application 100 may determine, based on the file size 116 of the target file 102, a storage cost 144 when the target file 102 is stored at the high-performance tier 104 of the storage system 103, a storage cost 146 when the target file 102 is stored at the medium-performance tier 106, and a storage cost 148 when the target file 102 is stored at the low-performance tier 108. Typically, the storage cost 144 for storing the target file 102 at the high-performance tier 104 is the highest, and the storage cost for storing the target file 102 at the low-performance tier 108 is the smallest, which depends on the unit cost 124 of the storage device at the high-performance tier 104, the unit cost 126 of the storage device at the medium-performance tier 106, and the unit cost 128 of the storage device at the low-performance tier 108. However, embodiments of the present disclosure do not limit the ranking of the unit costs of various storage tiers.

At a block 208, the method 200 determines a target tier at which the target file is stored based on the plurality of IO mode performances, the plurality of storage costs, the file size, and the file access frequency. For example, in the environment 100 as shown in FIG. 1, the management application 110 may determine the target tier 150 based on the IO mode performances 134, 136, and 138 of the IO mode 112 of the target file 102 at the high-performance tier 104, the medium-performance tier 106, and the low-performance tier 108, respectively, the storage costs 144, 146, and 148 for storing the target file 102 at the high-performance tier 104, the medium-performance tier 106, and the low-performance tier 108, respectively, the access frequency 114 of the target file 102, and the file size 116 of the target file 102. The management application 110 may then migrate the target file 102 to the target tier 150.

In this way, the determination of the storage tier 150 at which the target file 102 is to be stored not only is based on the access frequency 114 of the target file 102, but also takes into account the IO mode 112 of the target file 102 as well as the storage cost for the target file 102, which can thus optimize the file hierarchization strategy, thereby taking full advantage of the low-priced storage tiers and saving the cost of the storage system 103. In addition to this, files that are more suitable for storage at the high-performance storage tier can also be migrated to a higher storage tier, thus reducing the response time and improving the performance of the storage system 103.

FIG. 3 illustrates a schematic diagram of an example 300 of IO mode performance scores for different IO modes on different types of storage devices according to some embodiments of the present disclosure. As shown in FIG. 3, the example 300 includes four IO modes, and characteristics of the IO modes are reflected in the names of the IO modes, for example, 4K_0R_100S, 4K_0R_0S, 8K_70R_0S, and 64K_90R_100S. The 4K, 8K, and 64K in the IO mode names indicate the data size of one IO operation, and it should be understood that while only 4K, 8K, and 64K are illustrated in the example 300, the data size of one IO operation may also be other values. The R in the IO mode names indicates the proportion of read operations in all IO operations (and implicitly indicates the proportion of write operations in all IO operations). For example, 0R indicates that the proportion of read operations in all IO operations is zero (the corresponding proportion of write operations is one hundred percent), 70R indicates that the proportion of read operations in all IO operations is seventy percent (the corresponding proportion of write operations is thirty percent), and 90R indicates that the proportion of read operations in all IO operations is ninety percent (the corresponding proportion of write operations is ten percent). It should be understood that while only 0R, 70R, and 90R are shown in the example 300, the proportion of read operations in IO operations may also be other values. In addition, S in the IO mode names indicates the proportion of sequential operations in all IO operations (and implicitly indicates the proportion of random operations). For example, 0S indicates that the proportion of sequential operations in all IO operations is zero (the corresponding proportion of random operations is one hundred percent), and 100S indicates that the proportion of sequential operations in all IO operations is one hundred percent (the corresponding proportion of random operations is zero). It should be understood that while only 0S and 100S are shown in the example 300, the proportion of sequential operations in IO operations may also be other values.

As shown in FIG. 3, the example 300 further includes three storage device types, i.e., SSD, SAS, and NL-SAS, where SSD has the highest performance and is the most expensive, SAS has lower performance than SSD but is also less expensive than SSD, and NL-SAS has the lowest performance and is the least expensive. For example, the high-performance tier 104 in the environment 100 as shown in FIG. 1 may include SSD drives, the medium-performance tier 106 may include SAS drives, and the low-performance tier 108 may include NL-SAS drives. It should be understood that the storage device types in the example 300 are intended as examples only, and the storage device types may include other types depending on the number and configuration of storage tiers in the storage system.

As shown in FIG. 3, the example 300 may determine the IOPS (e.g., count per second), the bandwidth (e.g., MB per second), and the response time (e.g., in seconds or milliseconds) of each IO mode on different types of storage devices (representing different storage tiers). In addition, in the example 300, an IO mode performance score may also be determined based on the IOPS, the bandwidth, and the response time, where a high IO mode performance score indicates that a particular IO mode exhibits high performance on a particular type of storage devices. As shown in FIG. 3, some IO modes do not achieve performance improvement after being raised from SAS or NL-SAS to SSD. For example, the performance score of the IO mode 4K_0R_100S is 0.9897 on SAS and 1.0345 on NL-SAS, but its performance score on SSD is only 0.9752, which is lower than the performance scores on SAS and NL-SAS. It can be seen that if a file with the IO mode 4K_0R_100S is migrated from SAS or NL-SAS to SSD, the performance of the storage system will not be improved while the file consumes expensive SSD resources, so it is not worthwhile to migrate such files to SSD.

As shown in FIG. 3, some other IO modes can achieve significant performance improvement after being raised from SAS or NL-SAS to SSD. For example, the performance score of the IO mode 8K_70R_0S is 0.3475 on SAS and 0.2520 on NL-SAS, while its performance score on SSD is up to 2.4005. It can be seen that if a file with the IO mode 8K_70R_0S is migrated from SAS or NL-SAS to SSD, the performance of the storage system will be significantly improved, so it is worthwhile to migrate such files to SSD. In this way, files with IO modes that have a small performance difference across different storage tiers can be migrated to storage tiers that have low performance but are less expensive, thus saving costs while ensuring that the performance will not be significantly reduced.

Figure 4:
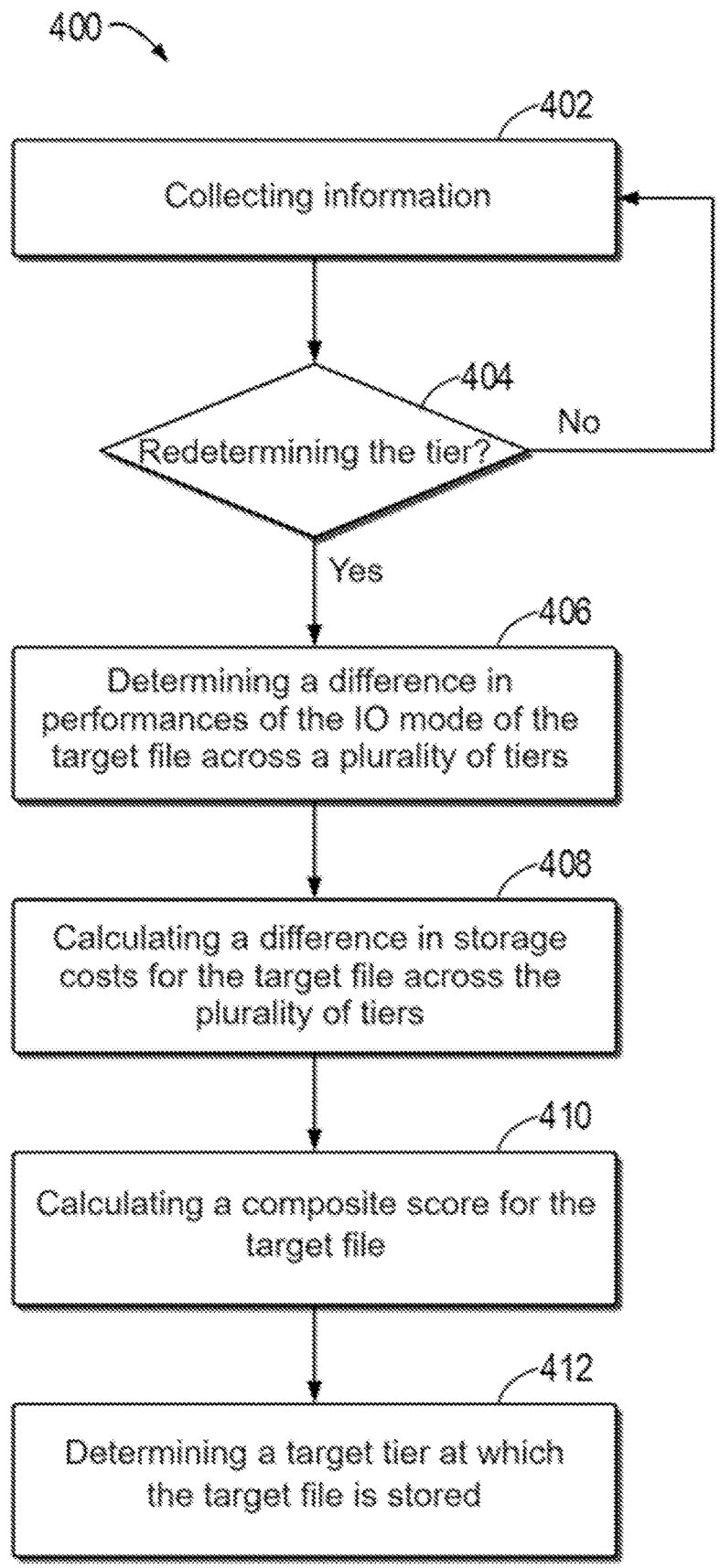
FIG. 4 illustrates a flow chart of an example process for determining a target tier for a target file according to some embodiments of the present disclosure.

FIG. 4 illustrates a flow chart of an example process 400 for determining a target tier for a target file according to some embodiments of the present disclosure. As shown in FIG. 4, at a block 402, the process 400 may collect various information related to a storage system, such as the bandwidth, IOPS, and response time of each IO mode at different storage tiers, a plurality of unit costs corresponding to the plurality of storage tiers, and the access frequency and file size of each file stored in the storage system. For example, in the environment 100 shown in FIG. 1, the management application 110 can collect the bandwidth (e.g., MB per second), the IOPS (e.g., count per second), and the response time (e.g., seconds or milliseconds) of the IO mode 112 (e.g., 8 KB of data in one operation, seventy percent read operations, and one hundred percent random operations) of the target file 102 at the high-performance tier 104 (e.g., a storage tier with SSD), the medium-performance tier 106 (e.g., a storage tier with SAS), and the low-performance tier 108 (e.g., a storage tier with NL-SAS) of the storage system 103, for use in determining the IO mode performances 134, 136, and 138 in subsequent steps. The management application 110 can also collect the file size 116 (e.g., MB or GB) of the target file 102 and the unit cost 124 (e.g., price per GB) of the high-performance tier 104 for use in determining the storage costs 144, 146, and 148. In addition, the management application 110 can also collect the access frequency 114 of the target file 102 for use in determining the target tier 150. In addition to the target file 102, the management application 110 can also collect relevant information about other files for use in determining the target tiers for the other files. The process 400 then proceeds to a block 404.

At the block 404, the process 400 can determine whether it is currently necessary to redetermine the tile for the file. In some embodiments, the tier for the file may be redetermined periodically (e.g., every one hour, every two hours, etc.). In some embodiments, the re-hierarchization of the file may be triggered according to a predetermined scheduling plan. If it is not currently necessary to redetermine the tier for the file, the process 400 returns to the block 402 to continue collecting relevant information; otherwise, the process 400 proceeds to a block 406.

At the block 406, the process 400 may determine a difference in performances of the IO mode of the target file across a plurality of tiers. For example, in the environment 100 as shown in FIG. 1, a difference in the IO mode performances 134, 136 and 138 may be determined by the management application 110. In some embodiments, a plurality of bandwidths, a plurality of IOPSs, and a plurality of response times corresponding to a plurality of tiers in an IO mode may be determined, and then a plurality of IO mode performances of that IO mode at the plurality of tiers of the storage system may be determined based on the plurality of bandwidths, the plurality of IOPSs, and the plurality of response times. In some embodiments, a plurality of standardized bandwidths, a plurality of standardized IOPSs, and a plurality of standardized response times corresponding to the plurality of tiers may be determined based on the plurality of bandwidths, the plurality of IOPSs, and the plurality of response times corresponding to the plurality of tiers, and then a plurality of IO mode performance scores corresponding to the plurality of tiers may be determined based on the plurality of standardized bandwidths, the plurality of standardized IOPSs, and the plurality of response times, an IO mode performance score being indicative of an IO mode performance at the corresponding tier. In some embodiments, an average IO mode performance score for the plurality of tiers may be determined based on the plurality of IO mode performance scores, and then a degree of dispersion of the plurality of IO mode performance scores may be determined, based on the plurality of IO mode performance scores and the average IO mode performance score, as the difference in performances of the IO mode across the plurality of tiers.

Figure 5A:
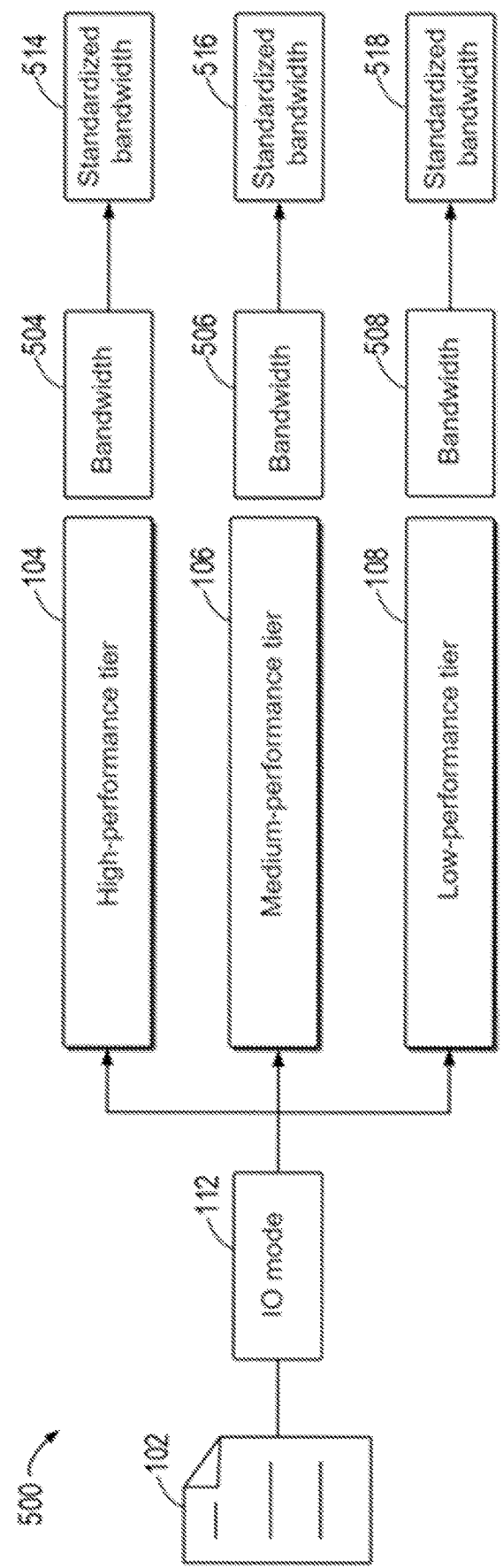
FIGS. 5A to 5D illustrate schematic diagrams of example processes for determining a standardized bandwidth, a standardized IOPS, a standardized response time, and a difference in IO mode performances of an IO mode of a target file at various tiers according to some embodiments of the present disclosure.
Figure 5B:
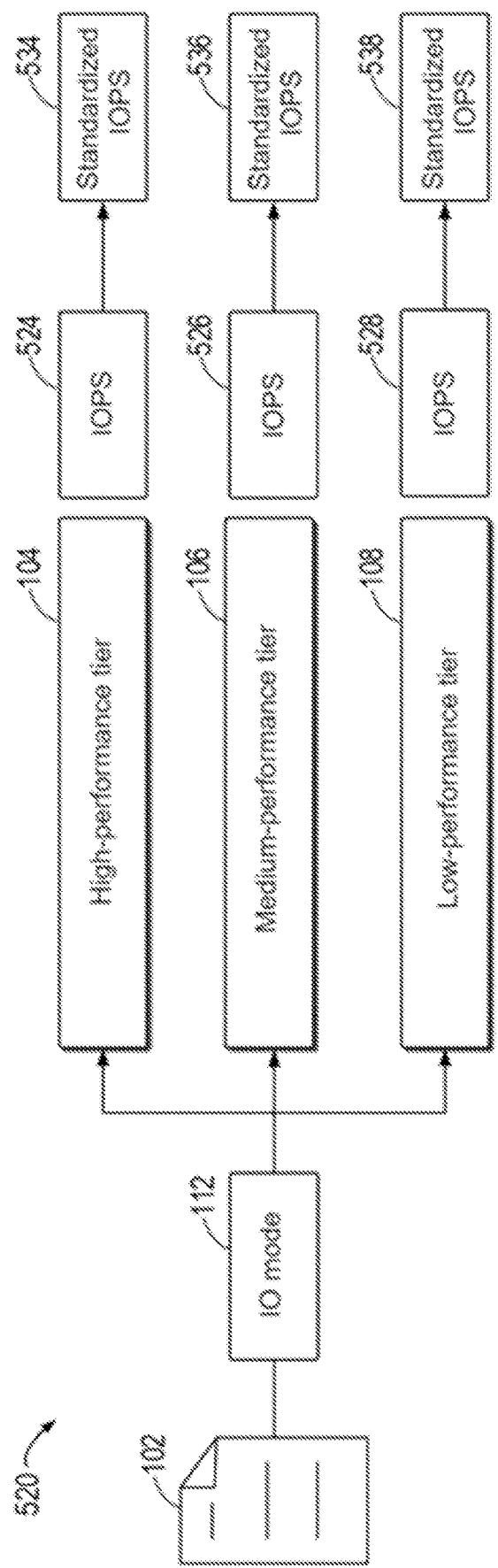
Figure 5C:
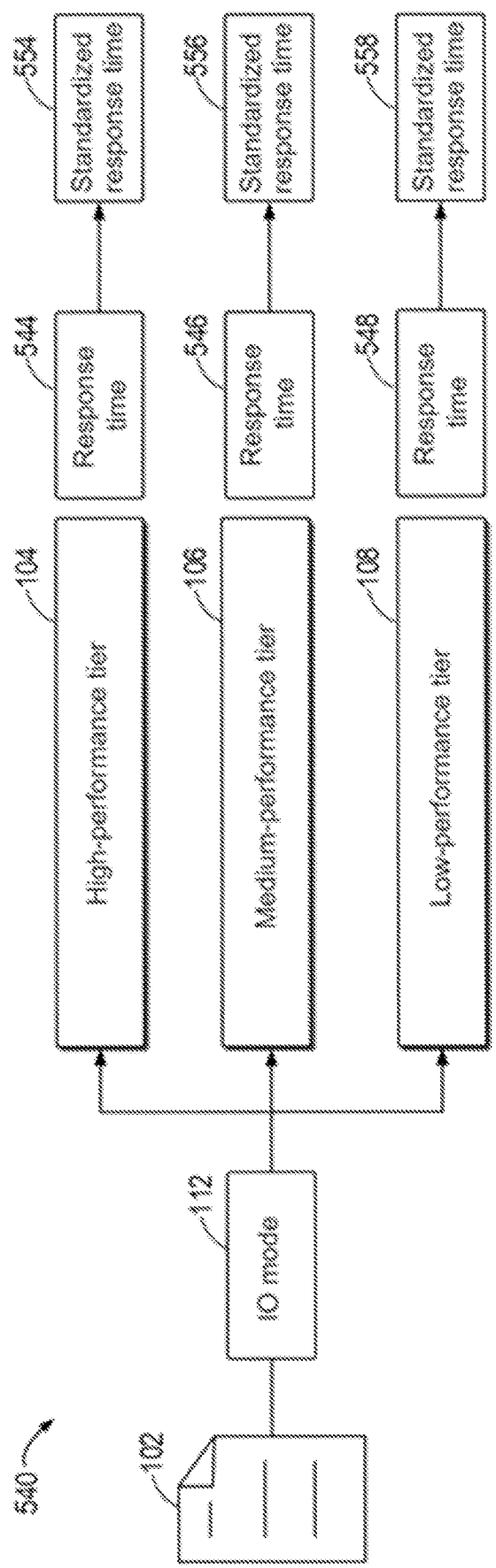

The process for determining the difference in performances of an IO mode of a target file across a plurality of tiers is described in detail below in conjunction with FIGS. 5A to 5D. The IO performance of the storage system can be determined by determining the bandwidth, the IOPS, and the response time, and since the bandwidth, the IOPS, and the response time are in different units, they need to be standardized to unify the units, and then the IO mode performance score is determined based on the standardized bandwidth (also referred to as the bandwidth score), the standardized IOPS (also referred to as the IOPS score), and the standardized response time (also referred to as the response time score). FIGS. 5A to 5C illustrate schematic diagrams of example processes for determining a standardized bandwidth, a standardized IOPS, and a standardized response time according to some embodiments of the present disclosure.

FIG. 5A illustrates a schematic diagram of an example process 500 for determining a standardized bandwidth of an IO mode of a target file at various tiers according to some embodiments of the present disclosure. As shown in FIG. 5A, the process 500 may determine a bandwidth 504 of the IO mode 112 of the target file 102 at the high-performance tier 104, a bandwidth 506 of the IO mode 112 at the medium-performance tier 106, and a bandwidth 508 of the IO mode 112 at the low-performance tier 108. The process 500 may then use the bandwidths 504, 506, and 508 to standardize each of them to obtain a standardized bandwidth 514 for the high-performance tier 104, a standardized bandwidth 516 for the medium-performance tier 106, and a standardized bandwidth 518 for the low-performance tier 108.

Here, the number of files on the storage system is denoted by I, and for each file $f_i$ ($1 \le i \le I$), the size of the file $f_i$ is denoted by $fs_i$. In addition, the type of the IO mode is denoted by J, with $p_j$ denoting the jth IO mode. There are K storage tiers in the storage system, with $t_k$ denoting the kth storage tier. The bandwidth of the IO mode $p_j$ on the storage tier $t_k$ is denoted by $B_{k,j}$. The larger the bandwidth of an IO mode at a storage tier, the higher the performance of that IO mode, so the standardized bandwidth $NB_{k,j}$ can be calculated by the following Equation (1):

$$NB_{k,j} = \frac{B_{k,j}}{\sum_{k=1}^{K} B_{k,j}} \qquad \text{Equation (1)}$$

FIG. 5B illustrates a schematic diagram of an example process 520 for determining a standardized IOPS of an IO mode of a target file at various tiers according to some embodiments of the present disclosure. As shown in FIG. 5B, the process 520 may determine an IOPS 524 of the IO mode 112 of the target file 102 at the high-performance tier 104, an IOPS 526 of the IO mode 112 at the medium-performance tier 106, and an IOPS 528 of the IO mode 112 at the low-performance tier 108. The process 520 may then use the IOPSs 524, 526, and 528 to standardize each of them to obtain a standardized IOPS 534 for the high-performance tier 104, a standardized IOPS 536 for the medium-performance tier 106, and a standardized IOPS 538 for the low-performance tier 108.

Here, IOPS$_{k,\,j}$ is used to denote the IOPS of the IO mode p$_j$ at the storage tier t$_k$. The larger the IOPS of an IO mode at a storage tier, the higher the performance of that IO mode, so the standardized IOPS, i.e., NIOPS$_{k,\,j}$, can be calculated by the following Equation (2):

$$NIOPS_{k,j} = \frac{IOPS_{k,j}}{\sum_{k=1}^{K} IOPS_{k,j}} \qquad \text{Equation (2)}$$

FIG. 5C illustrates a schematic diagram of an example process 540 for determining a standardized response time of an IO mode of a target file at various tiers according to some embodiments of the present disclosure. As shown in FIG. 5C, the process 540 may determine a response time 544 of the IO mode 112 of the target file 102 at the high-performance tier 104, a response time 546 of the IO mode 112 at the medium-performance tier 106, and a response time 548 of the IO mode 112 at the low-performance tier 108. The process 520 may then use the response times 544, 546, and 548 to standardize each of them to obtain a standardized response time 534 for the high-performance tier 104, a standardized response time 536 for the medium-performance tier 106, and a standardized response time 538 for the low-performance tier 108.

Here, L$_{k,j}$ is used to denote the response time of the IO mode p$_j$ at the storage tier t$_k$. The smaller the response time of an IO mode at a storage tier, the higher the performance of that IO mode, so the standardized response time, i.e., NL$_{k,\,j}$, can be calculated by the following Equation (3):

$$NL_{k,j} = \frac{1/L_{k,j}}{\sum_{k=1}^{K} 1/L_{k,j}} \qquad \text{Equation (3)}$$

Figure 5D:
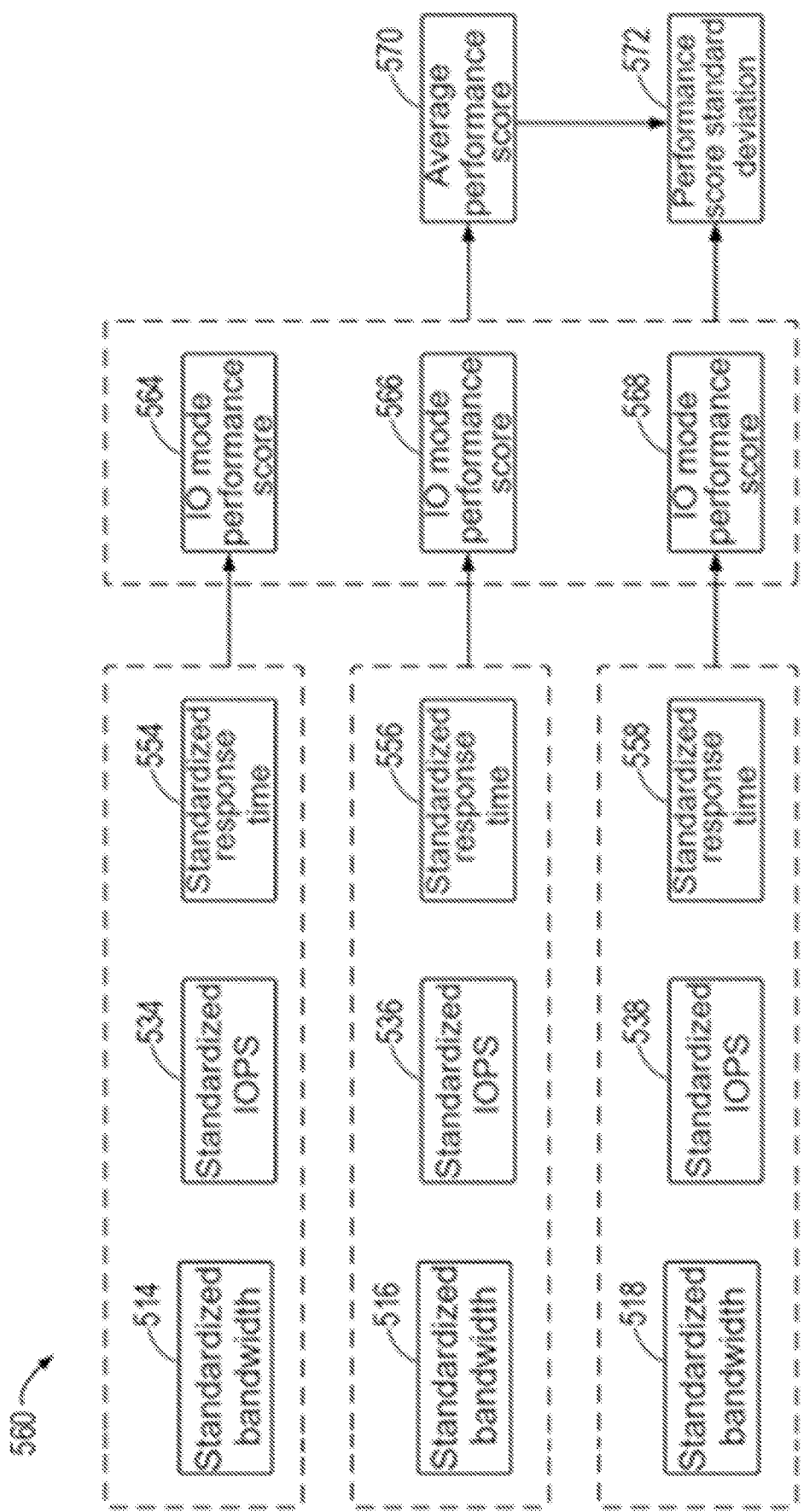

FIG. 5D illustrates a schematic diagram of an example process 560 for determining a difference in IO mode performances of an IO mode of a target file at various tiers according to some embodiments of the present disclosure. As shown in FIG. 5D, the process 560 may determine an IO mode performance score 564 of the IO mode 112 at the high-performance tier 104 based on the standardized bandwidth 514, the standardized IOPS 534, and the standardized response time 554. The process 560 may further determine an IO mode performance score 566 of the IO mode 112 at the medium-performance tier 106 based on the standardized bandwidth 516, the standardized IOPS 536, and the standardized response time 556. In addition, the process 560 may further determine an IO mode performance score 568 of the IO mode 112 at the low-performance tier 108 based on the standardized bandwidth 518, the standardized IOPS 538, and the standardized response time 558. The process 560 may then calculate an average performance score 570 based on the IO mode performance scores 564, 566, and 568, and calculate a performance score standard deviation 572 for the IO mode performance scores 564, 566, and 568 based on the average performance score 570. The performance score standard deviation 572 may be indicative of the degree of dispersion of the IO mode performance scores 564, 566, and 568, and may be indicative of the difference in performances of the IO mode 112 of the target file 102 across the high-performance tier 104, the medium-performance tier 106, and the low-performance tier 108.

Here, Perf$_{k,j}$ is used to denote the performance score of the IO mode p$_j$ at the storage tier t$_k$. As mentioned above, the IO mode performance score can be determined based on the bandwidth, the IOPS, and the response time of the IO mode at the storage tier, and thus the Perf$_{k,j}$ can be calculated by the following Equation (4):

$$Perf_{k,j} = NIOPS_{k,j} + NB_{k,j} + NL_{k,j} \qquad \text{Equation (4)}$$

Then, the standard deviation $\sigma_j$ of the performance scores of the IO mode p$_j$ over the K storage tiers can be calculated by the following Equation (5):

$$\sigma_j = \sqrt{\frac{\sum_{k=1}^{K}(Perf_{k,j} - NPerf_{average})^2}{K}} \qquad \text{Equation (5)}$$

where NPerf$_{average}$ is the average of the performance scores of the IO mode p$_j$ over the K storage tiers.

In this way, the IO mode performance of the IO mode at each storage tier can be determined in a quantitative manner based on the bandwidth, the IOPS, and the response time of the IO mode at each storage tier, so that the degree of dispersion of performances of the IO mode across the storage tiers can be further quantitatively determined, and a decision-making basis can be provided for determining whether it is worthwhile to migrate the target file to a storage tier with higher performance.

In some embodiments, the difference in performances of each IO mode at the plurality of tiers of the storage system may be pre-determined, and the pre-determined difference in performances may be stored at an appropriate location. When redetermining the target tier for the target file, the pre-determined difference in IO mode performances of the IO mode of the target file at different storage tiers can be directly read and found for use in subsequent operations. In this way, the time consumed in determining the difference in performances of the IO mode of the target file at different storage tiers can be saved, and computational resources can be saved to improve the performance of the management application.

Referring back to FIG. 4, at a block 408, the process 400 may calculate a difference in storage costs for the target file across the plurality of tiers. For example, in the environment 100 as shown in FIG. 1, the management application 110 may determine the storage cost 144 when the target file 102 is stored at the high-performance tier 104, the storage cost 146 when the target file 102 is stored at the medium-performance tier 106, and the storage cost 148 when the target file 102 is stored at the low-performance tier 108, as well as the differences in the storage costs 144, 146 and 148. In some embodiments, a plurality of storage costs when the target file is stored at the plurality of tiers, respectively, may be determined based on the file size of the target file and a plurality of unit storage space costs corresponding to the plurality of tiers of the storage system. In some embodiments, an average storage cost for the plurality of tiers may be determined based on the plurality of storage costs, and then a degree of dispersion of the plurality of storage costs may be determined, based on the plurality of storage costs and the average storage cost, as the difference in storage costs.

Figure 6:
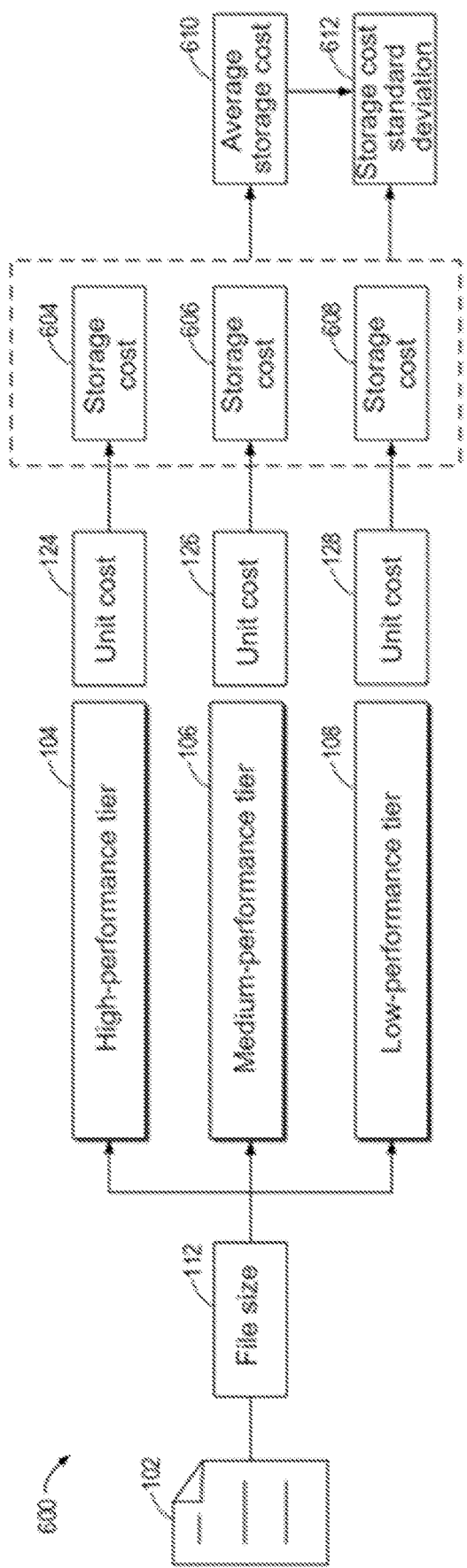
FIG. 6 illustrates a schematic diagram of an example process for determining a difference in storage costs when a target file is stored at various tiers according to some embodiments of the present disclosure.

The process for determining the difference in storage costs when the target file is stored at the plurality of tiers is described in detail below in conjunction with FIG. 6. FIG. 6 illustrates a schematic diagram of an example process 600 for determining a difference in storage costs when a target file is stored at various tiers according to some embodiments of the present disclosure. As shown in FIG. 6, the process 600 may determine a storage cost 604 when the target file 102 is stored at the high-performance tier 104 based on the file size 112 of the target file 102 and the unit cost 124 of the high-performance tier 104. The process 600 may also determine a storage cost 606 when the target file 102 is stored at the medium-performance tier 106 based on the file size of the target file 102 and the unit cost 126 of the medium-performance tier 106. In addition, the process 600 may also determine a storage cost 608 when the target file 102 is stored at the low-performance tier 108 based on the file size of the target file 102 and the unit cost 128 of the low-performance tier 108. The process 600 may then calculate an average storage cost 610 for the storage costs 604, 606, and 608, and utilize the average storage cost 610 to calculate a storage cost standard deviation 612 for the storage costs 604, 606, and 608. The storage cost standard deviation 612 may be indicative of the degree of dispersion of the storage costs 604, 606, and 608, and may be indicative of the difference in storage costs for the target file 102 when it is stored at the high-performance tier 104, the medium-performance tier 106, and the low-performance tier 108.

Here, $c_k$ is used to denote the unit cost (e.g., price per GB) of the storage tier k, and $c_{i,k}$ is used to denote the storage cost for the file $f_i$ when it is stored at the storage tier k. Then, $c_{i,k}$ can be calculated by the following Equation (6):

$$c_{i,k} = c_k * fs_i \qquad \text{Equation (6)}$$

The smaller the storage cost, the better, so the average storage cost $c_{i,avg}$ for the file $f_i$ when it is stored at various storage tiers can be calculated by using the following Equation (7):

$$c_{i,avg} = \frac{\sum_{k=1}^{K} 1/c_{i,k}}{K} \qquad \text{Equation (7)}$$

Then, the standard deviation $\sigma c_j$ of the storage costs for the file $f_i$ when it is stored at various storage tiers can be calculated by using the following Equation (8):

$$\sigma c_i = \sqrt{\frac{\sum_{k=1}^{K} (1/c_{i,k} - c_{i,avg})^2}{K}} \qquad \text{Equation (8)}$$

When the storage cost standard deviation $\sigma c_j$ is large, it indicates that there is a large difference in storage costs between different storage tiers, and therefore, it costs more to migrate the file $f_i$ from a low-performance tier to a high-performance tier. When $\sigma c_j$ is small, it indicates that there is no significant difference in storage costs between different storage tiers, and therefore, it costs less to migrate the file $f_i$ from a low-performance tier to a high-performance tier.

In this way, when determining the storage tier for the target file, it is possible to quantify the change in storage cost brought by migration, so as to provide a cost decision-making basis when determining the tier for the target file.

Referring back to FIG. 4, at a block 410, a composite score for the target file may be calculated based on the difference in performances of the IO mode of the target file across the plurality of tiers and the difference in storage costs for the target file across the plurality of tiers, the composite score being indicative of a gain associated with the performance and the cost resulting from migrating the target file from a low-performance tier of the storage system to a high-performance tier. In some embodiments, a file access density of the target file may be determined based on the file size and the file access frequency of the target file, the file access density being indicative of an average access frequency per unit file size. In some embodiments, the composite score for the target file may be calculated based on the difference in IO mode performances, the difference in storage costs, and the file access density. In some embodiments, a first weight for the difference in IO mode performances and a second weight for the difference in storage costs may be determined, and the composite score for the target file may be determined based on the difference in IO mode performances, the first weight, the difference in storage costs, the second weight, and the access density.

Figure 7:
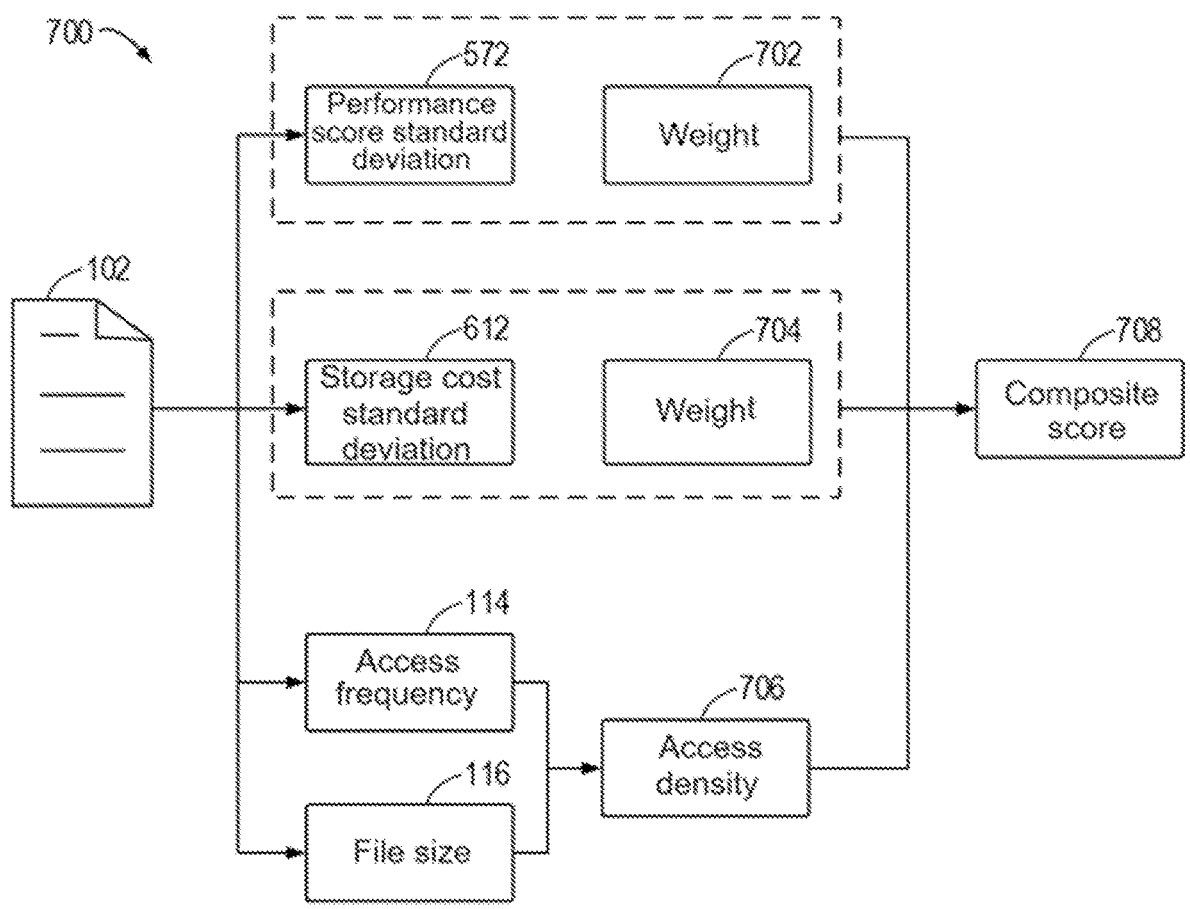
FIG. 7 illustrates a schematic diagram of an example process for determining a composite score of a target file according to some embodiments of the present disclosure.

The detailed process for determining a composite score for a target file is described in detail below in conjunction with FIG. 7. FIG. 7 illustrates a schematic diagram of an example process 700 for determining a composite score of a target file according to some embodiments of the present disclosure. As shown in FIG. 7, the process 700 may determine an access density 706 based on the access frequency 114 and the file size 116 of the target file 102, the access density 706 being indicative of the access frequency per unit file size of the target file 102. In addition, the process 700 may also assign a weight 702 to the performance score standard deviation 572 of the IO mode of the target file, and a weight 704 to the storage cost standard deviation 612 of the target file. In some embodiments, the sum of the weight 702 and the weight 704 is one, and when an administrator of the storage system values the IO performance more, the weight 702 may be increased and the weight 704 decreased accordingly; and when the administrator values the cost more, the weight 704 may be increased and the weight 702 decreased accordingly. The process 700 may then calculate a composite score 708 for the target file 102 based on the performance score standard deviation 573, the weight 702, the storage cost standard deviation 612, the weight 704, and the access density 706. The higher the comprehensive score 708, the more worthwhile the target file 102 is to be migrated to a high-performance storage tier.

Here, $fq_i$ is used to denote the total access frequency of the file $f_i$ during the last monitoring cycle, so the file access density $fr_i$ can be calculated by the following Equation (9):

$$fr_i = \frac{fq_i}{fs_i} \qquad \text{Equation (9)}$$

Then, the composite score $cs_i$ of the target file can be calculated according to the file access density $fr_i$, the IO mode performance standard deviation $\sigma_j$, and the storage cost standard deviation $\sigma c_j$ and through the following Equation (10):

$$cs_i = (w_p \cdot (1 + \sigma_j) + w_c \cdot (1 - \sigma c_i)) \cdot fr_i \qquad \text{Equation (10)}$$

where $w_p$ is the weight for the IO mode performance standard deviation $\sigma_j$, and $w_c$ is the weight for the storage cost standard deviation $\sigma c_j$, and $w_p + w_c = 1$. According to Equation (10), it can be seen that the greater the difference in performances of the IO mode of the target file across different storage tiers, the more worthwhile the target file is to be migrated to a high-performance storage tier, whereas the greater the difference in storage costs when the target file is stored at various storage tiers, the more expensive a storage device at the high-performance tier is, and for cost considerations, the lower the composite score $cs_i$ of the target file is.

In this way, a composite score can be determined for the target file based on the difference in performances of the IO mode across various storage tiers, the storage costs for the target file at various storage tiers, and the access density of the target file, so that the target tier for the target file can be considered more comprehensively, and therefore, the overall performance of the storage system can be improved and the cost can be reduced.

Referring back to FIG. 4, at a block 412, the process 400 may determine the target tier for the target file based on composite scores of a plurality of files. In some embodiments, a plurality of composite scores corresponding to a plurality of files to be stored may be determined, wherein the plurality of files comprise the target file. In some embodiments, the target tier at which the target file is stored may be determined based on the plurality of composite scores. In some embodiments, a ranked plurality of composite scores may be determined by ranking the plurality of composite scores. In some embodiments, tiers at which the plurality of files are stored may be determined based on the ranked plurality of composite scores, wherein a file ranked higher among the plurality of files is stored at a tier with higher performance, and a file ranked lower among the plurality of files is stored at a tier with lower performance. In some other embodiments, a plurality of thresholds corresponding to the various tiers may be pre-determined, and the target tier for the target file may be determined based on the composite score of the target file and the plurality of thresholds.

Figure 8:
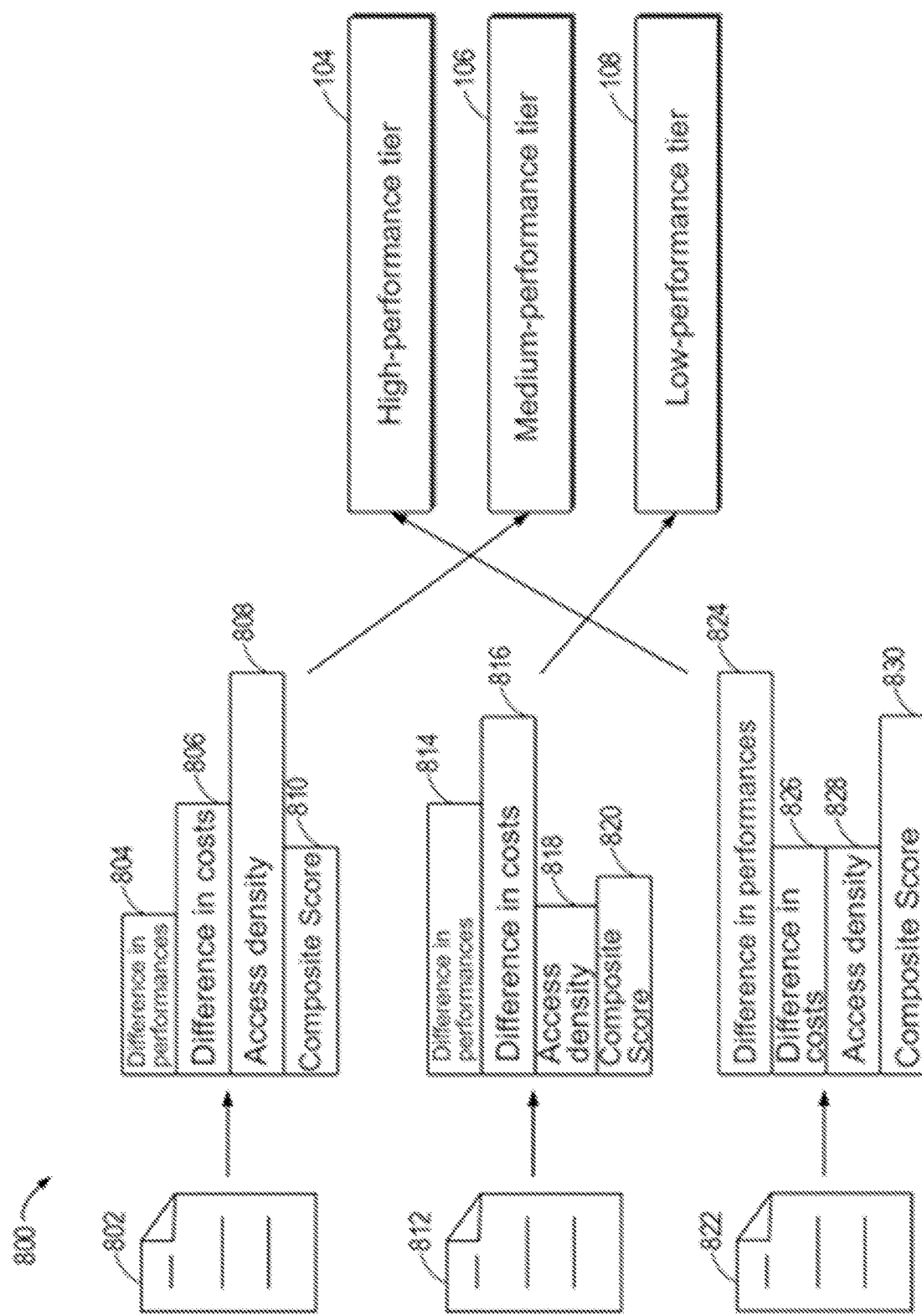
FIG. 8 illustrates a schematic diagram of an example process for determining a target tier at which a target file is stored based on a composite score of the target file according to some embodiments of the present disclosure.

The process for determining the target tier at which the file is stored is described in detail below in conjunction with FIG. 8. FIG. 8 illustrates a schematic diagram of an example process 800 for determining a target tier at which a target file is stored based on a composite score of the target file according to some embodiments of the present disclosure. As shown in FIG. 8, the process 800 needs to determine the tiers for files 802, 812, and 822. The process 802 may determine a difference in IO mode performances 804, a difference in storage costs 806, and an access density 808 of the target file 802 and calculate a composite score 810 based on these metrics. The process 802 may also determine a difference in IO mode performances 814, a difference in storage costs 816, and an access density 818 of the target file 812 and calculate a composite score 820 based on these metrics. In addition, the process 802 may also determine a difference in IO mode performances 824, a difference in storage costs 826, and an access density 828 of the target file 822 and calculate a composite score 830 based on these metrics. As shown in FIG. 8, the file 802 has the highest access density 808, and in a conventional solution, the file 802 will be migrated to a high-performance tier. However, in the process 800, since the difference in IO mode performances 804 of the file 802 is low and the storage cost 806 is high, it indicates that migrating the file 802 to a high-performance tier will not bring a significant IO performance improvement but will increase the storage cost significantly, so the composite score 810 of the file 802 is not the highest score.

As shown in FIG. 8, the file 812 has the lowest access density 818 and a high difference in storage costs 816, so that although its difference in IO mode performances 814 is not low, the composite score 820 is the lowest, indicating that the access frequency of the file 812 is low, and the cost of storing it in a high-performance tier is high, so the composite score 820 of the file 812 is the lowest. As shown in FIG. 8, the file 822 has the highest difference in IO mode performances 824 and has a medium difference in storage costs 826 and access density 828, indicating that migrating the file 822 to a high-performance tier may improve performance to a great degree without paying a large storage cost, so the composite score 830 of the file 822 is the highest. The process 800 may then rank the files 802, 812, and 822 based on the composite scores 810, 820, and 830, and then determine the target tier based on the ranking results. For example, in the example shown in FIG. 8, the process 800 may migrate the file 802 to the medium-performance tier 106, the file 812 to the low-performance tier 108, and the file 822 to the high-performance tier 104.

In some embodiments, a plurality of proportions corresponding to the various tiers may be pre-determined, and the files may then be hierarchized based on the plurality of proportions. For example, after ranking according to the composite scores, the top twenty percent of the files may be migrated to the high-performance tier 104, the files ranked between twenty and forty percent may be migrated to the medium-performance tier 106, and the other files may be migrated to the low-performance tier 108. In some embodiments, a plurality of composite score thresholds corresponding to the various tiers may be pre-determined, and then the files may be hierarchized based on the plurality of composite score thresholds. For example, files with composite scores greater than a first threshold are migrated to the high-performance tier 104, files with composite scores between the first and second thresholds are migrated to the medium-performance tier 106, and files with composite scores less than the second threshold are migrated to the low-performance tier 108.

In this way, the determination of the storage tier for the target file not only is based on the access frequency of the target file, but also takes into account the IO mode of the target file as well as its storage cost, which can thus optimize the file hierarchization strategy, thereby taking full advantage of the low-priced storage tiers and saving the cost of the storage system. In addition to this, files that are better suitable for storage at the high-performance tier can also be migrated to a higher storage tier, thus reducing the response time and improving the performance of the storage system.

Figure 9:
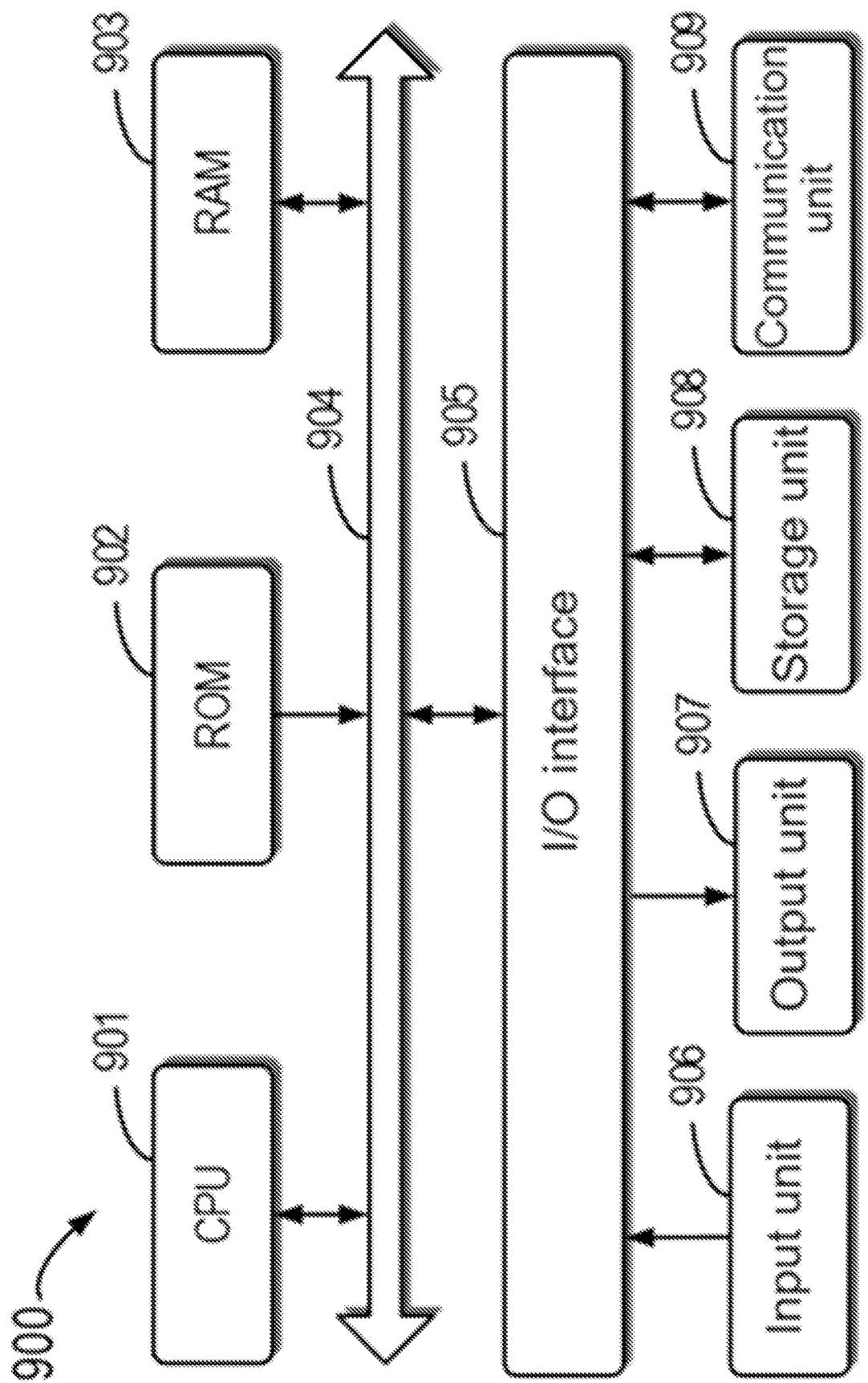
FIG. 9 illustrates a block diagram of a device that can implement a plurality of embodiments of the present disclosure.

FIG. 9 illustrates a schematic block diagram of an example device 900 which may be used to implement embodiments of the present disclosure. For example, the device running the management application 110 as shown in FIG. 1 may be the example device 900 as shown in FIG. 9. As illustrated in the figure, the device 900 includes a computing unit 901 that can execute various appropriate actions and processing according to computer program instructions stored in a read-only memory (ROM) 902 or computer program instructions loaded from a storage unit 908 to a random access memory (RAM) 903. Various programs and data required for the operation of the device 900 may also be stored in the RAM 903. The computing unit 901, the ROM 902, and the RAM 903 are connected to each other through a bus 904. An input/output (I/O) interface 905 is also connected to the bus 904.

A plurality of components in the device 900 are connected to the I/O interface 905, including: an input unit 906, such as a keyboard and a mouse; an output unit 907, such as various types of displays and speakers; a storage unit 908, such as a magnetic disk and an optical disc; and a communication unit 909, such as a network card, a modem, and a wireless communication transceiver. The communication unit 909 allows the device 900 to exchange information/data with other devices via a computer network, such as the Internet, and/or various telecommunication networks.

The computing unit 901 may comprise various general-purpose and/or special-purpose processing components with processing and computing capabilities. Some examples of computing units 901 include, but are not limited to, central processing units (CPUs), graphics processing units (GPUs), various specialized artificial intelligence (AI) computing chips, various computing units for running machine learning model algorithms, digital signal processors (DSPs), and any appropriate processors, controllers, microcontrollers, etc. The computing unit 901 performs various methods and processes described above, such as the method 200. For example, in some embodiments, the method 200 may be implemented as a computer software program that is tangibly included in a machine-readable medium, such as the storage unit 908. In some embodiments, part or all of the computer program may be loaded and/or installed onto the device 900 via the ROM 902 and/or the communication unit 909. When the computer program is loaded to the RAM 903 and executed by the computing unit 901, one or more steps of the method 200 described above may be performed. Alternatively, in other embodiments, the computing unit 901 may be configured to implement the method 200 in any other suitable manners (such as by means of firmware).

The functions described herein above may be performed at least in part by one or more hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Load Programmable Logic Device (CPLD), and the like.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combinations thereof. Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

What is claimed is:

1. A method, comprising:
   determining, by a system comprising at least one processor, an input/output (IO) mode, a file size, and a file access frequency of a target file;
   determining respective IO mode performance scores of the IO mode at different tiers of a hierarchical file storage system;
   determining, a first difference in the respective IO mode performance scores of the IO mode across the different tiers of the hierarchical file storage system, wherein determining the first difference comprises:
      determining an average IO mode performance score for the different tiers based on the respective IO mode performance scores, and determining a degree of dispersion of the respective IO mode performance scores as the first difference based on the IO mode performances and the average IO mode performance;

determining, based on the file size of the target file, respective storage costs of storing the target file at the different tiers of the hierarchical file storage system;

determining a second difference in the respective storage costs of storing the target file at the different tiers of the hierarchical file storage system;

determining a target tier of the different tiers at which the target file is to be stored based on the respective IO mode performance scores, the respective storage costs, the file size, and the file access frequency, the first difference in the IO mode performances, and the second difference in the respective storage costs; and storing the target file at the target tier of the hierarchical file storage system.

2. The method according to claim 1, wherein determining the respective IO mode performances scores of the IO mode at the different tiers of the hierarchical file storage system comprises:

determining respective bandwidths, respective input/output operations per second (IOPSs), and respective response times corresponding to the different tiers in the IO mode; and determining the respective IO mode performances scores of the IO mode at the different tiers of the hierarchical file storage system based on the respective bandwidths, the respective IOPSs, and the respective response times.

3. The method according to claim 2, wherein determining the respective IO mode performances scores of the IO mode at the different tiers of the hierarchical file storage system further comprises:

determining respective standardized bandwidths, respective standardized IOPSs, and respective standardized response times corresponding to the different tiers based on the respective bandwidths, the respective IOPSs, and the respective response times corresponding to the different tiers; and determining the respective IO mode performance scores corresponding to the different tiers based on the respective standardized bandwidths, the respective standardized IOPSs, and the respective standardized response times, an IO mode performance score in the respective IO mode performance scores being indicative of an IO mode performance at a corresponding tier.

4. The method according to claim 1, wherein determining the respective storage costs of storing the target file at the different tiers of the hierarchical file storage system comprises:

determining the respective storage costs of storing the target file at the different tiers based on the file size of the target file and respective unit storage space costs corresponding to the different tiers of the hierarchical file storage system.

5. The method according to claim 1, wherein determining the second difference comprises:

determining an average storage cost for the different tiers based on the respective storage costs; and determining a degree of dispersion of the respective storage costs as the second difference based on the respective storage costs and the average storage cost.

6. The method according to claim 1, wherein determining the target tier at which the target file is to be stored further comprises:

determining a file access density of the target file based on the file size and the file access frequency of the target file, the file access density being indicative of an average access frequency per unit file size; and determining the target tier at which the target file is to be stored based further on the file access density.

7. The method according to claim 6, wherein determining the target tier at which the target file is to be stored further comprises:

determining a first weight for the first difference and a second weight for the second difference;

determining a composite score for the target file based on the first difference, the first weight, the second difference, the second weight, and the file access density, the composite score being indicative of a gain associated with performance and storage cost resulting from migrating the target file from a low-performance tier of the hierarchical file storage system to a high-performance tier higher than the low-performance tier; and determining, based on the composite score of the target file, the target tier at which the target file is to be stored.

8. The method according to claim 7, wherein determining the target tier at which the target file is to be stored further comprises:

determining respective composite scores corresponding to a group of files to be stored, wherein the group of files comprise the target file; and determining, based on the respective composite scores, the target tier at which the target file is to be stored.

9. The method according to claim 8, wherein determining the target tier at which the target file is to be stored further comprises:

determining ranked composite scores by ranking the respective composite scores; and determining, based on the ranked composite scores, tiers at which the group of files are stored, wherein a file ranked higher among the group of files is stored at a first tier with a higher performance than a second tier with a lower performance, and a file ranked lower among the group of files is stored at the second tier with the lower performance.

10. The method according to claim 1, wherein the IO mode is indicative of at least one of a data size of an IO operation, a read operation proportion, or a sequential access proportion.

11. A device, comprising:

at least one processor; and at least one memory coupled to the at least one processor and having instructions stored thereon, wherein the instructions, when executed by the at least one processor, cause the device to perform actions comprising:

determining an input/output (IO) mode, a file size, and a file access frequency of a target file;

determining respective IO mode performance scores of the IO mode at a plurality of tiers of a storage system;

determining, a first difference in the respective IO mode performance scores of the IO mode across the plurality of tiers of the hierarchical file storage system;

determining, based on the file size of the target file, respective storage costs of storing the target file at the plurality of tiers of the storage system;

determining a second difference in the respective storage costs of storing the target file at the plurality of tiers of the hierarchical file storage system, wherein determining the second difference comprises:

determining an average storage cost for the plurality of tiers based on the respective storage costs, and determining a degree of dispersion of the respective storage costs as the second difference based on the respective storage costs and the average storage cost;

determining a target tier of the plurality of tiers at which the target file is to be stored based on the respective IO mode performance scores, the respective storage costs, the file size, and the file access frequency, the first difference in the IO mode performances, and the second difference in the respective storage costs; and storing the target file at the target tier of the storage system.

12. The device according to claim 11, wherein determining the respective IO mode performance scores of the IO mode at the plurality of tiers of the storage system comprises:

determining a plurality of bandwidths, a plurality of input/output operations per second (IOPSs), and a plurality of response times corresponding to the plurality of tiers in the IO mode; and determining the respective IO mode performance scores of the IO mode at the plurality of tiers of the storage system based on the plurality of bandwidths, the plurality of IOPSs, and the plurality of response times.

13. The device according to claim 12, wherein determining the respective IO mode performance scores of the IO mode at the plurality of tiers of the storage system further comprises:

determining a plurality of standardized bandwidths, a plurality of standardized IOPSs, and a plurality of standardized response times corresponding to the plurality of tiers based on the plurality of bandwidths, the plurality of IOPSs, and the plurality of response times corresponding to the plurality of tiers; and determining respective IO mode performance scores corresponding to the plurality of tiers based on the plurality of standardized bandwidths, the plurality of standardized IOPSs, and the plurality of standardized response times, an IO mode performance score in the plurality of IO mode performance scores being indicative of an IO mode performance at a corresponding tier.

14. The device according to claim 11, wherein determining the first difference comprises:

determining an average IO mode performance score for the different tiers based on the respective IO mode performance scores, and determining a degree of dispersion of the respective IO mode performance scores as the first difference based on the IO mode performances and the average IO mode performance.

15. A computer program product, the computer program product being stored on a non-transitory computer-readable medium and comprising machine-executable instructions, wherein the machine-executable instructions, when executed, cause a machine to perform operations, comprising:

determining an input/output (IO) mode, a file size, and a file access frequency of a target file;

determining a file access density of the target file based on the file size and the file access frequency of the target file, the file access density being indicative of an average access frequency per unit file size;

determining respective IO mode performance scores of the IO mode at a plurality of tiers of a storage system;

determining a first difference in the respective IO mode performance scores of the IO mode across the plurality of tiers of the storage system;

determining, based on the file size of the target file, respective storage costs of storing the target file at the plurality of tiers of the storage system;

determining second difference in the respective storage costs of storing the target file at the plurality of tiers of the storage system;

determining a target tier at which the target file is to be stored based on the respective IO mode performance scores, the respective storage costs, the file size, the file access frequency, the first difference, the second difference, and the file access density; and storing the target file at the target tier of the storage system.

16. The computer program product according to claim 15, wherein determining the target tier at which the target file is to be stored further comprises:

determining a first weight for the first difference and a second weight for the second difference;

determining a composite score for the target file based on the first difference, the first weight, the second difference, the second weight, and the file access density, the composite score being indicative of a gain associated with performance and storage cost resulting from migrating the target file from a low-performance tier of the hierarchical file storage system to a high-performance tier higher than the low-performance tier; and determining, based on the composite score of the target file, the target tier at which the target file is to be stored.

17. The computer program product according to claim 16, wherein determining the first difference comprises:

determining an average IO mode performance score for the plurality of tiers based on the respective IO mode performance scores; and determining a degree of dispersion of the respective IO mode performance scores as the first difference based on the plurality of IO mode performances and the average IO mode performance.

18. The computer program product according to claim 16, wherein determining the second difference in comprises:

determining an average storage cost for the plurality of tiers based on the respective storage costs; and determining a degree of dispersion of the respective storage costs as the second difference based on the plurality of storage costs and the average storage cost.

19. The computer program product according to claim 16, wherein determining the respective IO mode performances scores of the IO mode at the plurality of tiers of the storage system further comprises:

determining respective standardized bandwidths, respective standardized IOPSs, and respective standardized response times corresponding to the different tiers based on the respective bandwidths, the respective IOPSs, and the respective response times corresponding to the plurality of tiers; and determining the respective IO mode performance scores corresponding to the plurality of tiers based on the respective standardized bandwidths, the respective standardized IOPSs, and the respective standardized response times, an IO mode performance score in the respective IO mode performance scores being indicative of an IO mode performance at a corresponding tier.

20. The computer program product according to claim 15, wherein determining the respective IO mode performances scores of the IO mode at the plurality of tiers of the storage system comprises:
    determining respective bandwidths, respective input/output operations per second (IOPSs), and respective response times corresponding to the plurality of tiers in the IO mode; and
    determining the respective IO mode performances scores of the IO mode at the plurality of tiers of the storage system based on the respective bandwidths, the respective IOPSs, and the respective response times.

\* \* \* \* \*